UNITED STATES PATENT OFFICE.

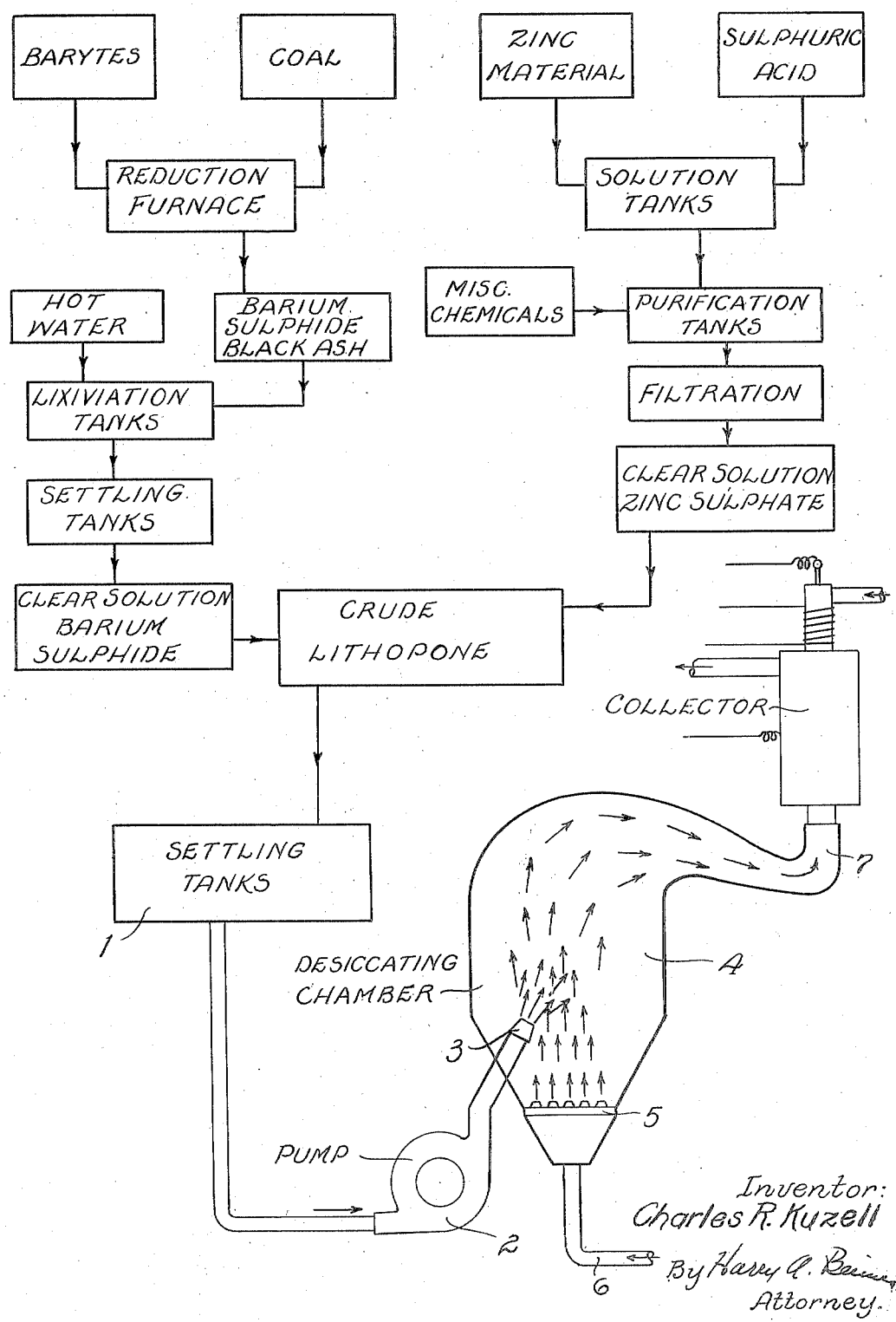

CHARLES R. KUZELL, OF CLARKDALE, ARIZONA.

PROCESS OF MANUFACTURING LITHOPONE.

1,399,500.  Specification of Letters Patent.  Patented Dec. 6, 1921.

Application filed August 15, 1921. Serial No. 492,342.

*To all whom it may concern:*

Be it known that I, CHARLES R. KUZELL, a citizen of the United States, residing at Clarkdale, in the county of Yavapai and State of Arizona, have invented certain new and useful Improvements in Processes of Manufacturing Lithopone, of which the following is a specification.

My invention has relation to improvements in the manufacture of lithopone, the process of which consists in the novel combination of steps more fully set forth hereinafter.

The object of the present invention is to simplify the present method of manufacture of lithopone by eliminating all the steps subsequent to the precipitation of crude lithopone, and substituting fewer and simpler steps whereby less plant equipment is required and consequently a reduced cost of operation is accomplished.

Lithopone is a white paint pigment and consists in a mixture of substantially 70% barium sulfate and 30% zinc sulfid although commercially these proportions vary greatly and the lithopone is sold under names that indicate the grade.

Briefly the process of manufacture up to the precipitation of crude lithopone may be described as follows, reference being had to the accompanying drawing showing a flow sheet illustrating the usual practice up to the precipitation of crude lithopone and the subsequent steps of dehydration and preparation which constitute my improvement:

Barytes is reduced with coal in a suitable furnace and a clear solution of barium sulfid obtained by lixiviation of the black ash with hot water. The barium sulfid solution is added to a purified solution of zinc sulfate (obtained in any well known manner such as treating a zinc material with sulfuric acid) whereupon the crude lithopone is precipitated. Now, under the present practice this crude lithopone is subjected to a number of operations before the finished product is obtained such as filtering, drying, calcining, quenching in water, grinding, etc., all of which require equipment and take time to perform. I have greatly simplified the refining of the crude lithopone as will be better apparent from what follows.

Referring to the drawing, 1 represents a settling tank (there may be a number of these tanks) in which the crude lithopone is allowed to thicken by settling until it is concentrated to a suitably dense pulp after which it is drawn off by a high pressure pump 2 and discharged through suitable spray nozzles 3 into a desiccating chamber 4 through which the fine spray is carried by a current of air admitted to the chamber 4 through a spray head 5 terminating the air supply conduit 6. The air current and the finely divided lithopone are thoroughly mixed in the desiccating chamber, the latter being carried through the chamber by the air current, which dries the lithopone as it is carried through the chamber. The dried lithopone is discharged from the chamber 4 through a conduit 7 communicating with an electrical precipitation chamber (such electrical precipitation being generally known as the Cottrell process) where the lithopone held in suspension by the air current is precipitated as an extremely finely divided powder and in finished condition. The finely divided lithopone may also be collected in a bag house such as is used for collecting the mineral particles from furnace fume.

As is well known, lithopone has the property of darkening when exposed to the light, and various processes have been evolved with a view of preventing this. This darkening is caused by a reduction of the zinc sulfid to metallic zinc and the only way to prevent it is by providing a protective film over the zinc sulfid. I accomplish this as follows:

The air discharged into the chamber 4 is heated not only to dry the lithopone but also cause a superficial oxidation of the zinc sulfid according to the equation $ZnS + 3O = ZnO + SO_2$.

The ZnO forms a protective film around the ZnS and thus prevents darkening of the lithopone when exposed to the light. The temperature of the heated air is just sufficient to oxidize the sulfid not to exceed from 3% to 5% of zinc oxid in the finished lithopone, the composition of which would then be substantially Barium sulfate_____ 68%
Zinc sulfate_____ 28%
Zinc oxid_____ 4% a very good grade of lithopone that will not darken on exposure to the light.

Having described my invention, I claim:

1. The hereindescribed method of preparing lithopone which consists in precipitating crude lithopone from a mixture of barium sulfid and zinc sulfate solutions, permitting the liquid containing crude lithopone to thicken by settling, thereafter spraying the liquid into a drying chamber in contact with air, and precipitating the lithopone as a fine powder.

2. The process of manufacturing lithopone which consists in precipitating crude lithopone from a mixture of barium sulfid and zinc sulfate solutions, drawing off the liquid containing crude lithopone and discharging the same as a fine spray into a current of air whereby it will be dried as a fine powder and collecting the powder so formed.

3. In the manufacture of lithopone, the process which comprises the precipitation of crude lithopone from a mixture of barium sulfid and zinc sulfate solutions, thickening the precipitated lithopone by settling, drawing off the liquid so thickened and discharging the same as a fine spray into a drying chamber and thereafter collecting the lithopone as a finely divided powder.

4. In the manufacture of lithopone, the process which comprises the precipitation of crude lithopone from a mixture of barium sulfid and zinc sulfate solutions, drawing off the liquid and discharging the same as a fine spray into a drying chamber and thereafter collecting the lithopone as a finely divided powder.

5. The process of manufacturing lithopone which consists in precipitating crude lithopone from a mixture of barium sulfid and zinc sulfate, discharging the liquid containing crude lithopone as a fine spray into a current of heated air whereby the zinc sulfid constituent of the lithopone will undergo a partial superficial oxidation and thereafter collecting the finished product as a finely divided powder.

6. The process of manufacturing lithopone which consists in precipitating crude lithopone from a mixture of barium sulfid and zinc sulfate solutions, permitting the liquid containing crude lithopone to thicken by settling, discharging the thickened liquid as a fine spray into an oxidizing atmosphere heated sufficiently to cause partial superficial oxidation of the zinc sulfid ingredients, and thereafter collecting the finished product as a finely divided powder.

7. The process of manufacturing lithopone which consists in precipitating crude lithopone from a mixture of barium sulfid and zinc sulfate solutions, permitting the liquid containing crude lithopone to thicken by settling, discharging the thickened liquid as a fine spray into an oxidizing atmosphere heated sufficiently to cause partial superficial oxidation of the zinc sulfid ingredients, and thereafter conducting the dried lithopone to an electrical precipitation chamber where the lithopone is precipitated as a finely divided powder.

In testimony whereof I hereunto affix my signature.

CHARLES R. KUZELL.